United States Patent [19]
Arin et al.

[11] Patent Number: 5,404,258
[45] Date of Patent: Apr. 4, 1995

[54] HARD DISK DRIVE PRECISION HEAD POSITIONER HAVING A SELF-ALIGNING HEAD POSITIONER/MAGNETIC COIL BOBBIN INTERFACE

[75] Inventors: Haldun Arin, Moorpark; Kenneth Murray, Granada Hills, both of Calif.

[73] Assignee: Micropolis Corporation, Chatsworth, Calif.

[21] Appl. No.: 41,676

[22] Filed: Apr. 1, 1993

[51] Int. Cl.$^6$ ............................................. G11B 21/08
[52] U.S. Cl. ................................................ 360/106
[58] Field of Search ........................................ 360/106

[56] References Cited

U.S. PATENT DOCUMENTS

| | | | |
|---|---|---|---|
| 4,796,122 | 1/1989 | Levy et al. | 360/98.01 |
| 4,879,617 | 11/1989 | Sampietro et al. | 360/106 |
| 4,939,600 | 7/1990 | Desai et al. | 360/78.04 |
| 4,949,201 | 8/1990 | Abed | 360/78.07 |
| 4,989,108 | 1/1991 | Chang | 360/105 |

Primary Examiner—Robert S. Tupper
Attorney, Agent, or Firm—Poms, Smith, Lande & Rose

[57] ABSTRACT

A precision magnetic head positioner assembly for a Winchester-type hard disk drive storage system includes a main rotatable integral head positioner body and an integral magnetic coil assembly. The positioner body includes outwardly extending integral head positioning arms and a seating surface comprised of two angled lateral seating surfaces. The integral magnetic coil assembly comprises a coil frame and a mounting surface having two angled lateral mounting faces which engage the positioner angled seating surfaces for mounting with fasteners. Precision self-alignment of the positioner seating and bobbin mounting surfaces is provided by an alignment ledge protruding outwardly from the positioner seating surface which engages the lower edge of the bobbin mounting surface. An interference between the positioner seating surface and bobbin mounting surface angles improves mounting alignment and stability.

2 Claims, 2 Drawing Sheets

HARD DISK DRIVE PRECISION HEAD POSITIONER HAVING A SELF-ALIGNING HEAD POSITIONER/MAGNETIC COIL BOBBIN INTERFACE

FIELD OF THE INVENTION

This invention relates to Winchester or hard disk digital storage systems. In particular, the present invention relates to a hard disk drive precision head positioner assembly.

BACKGROUND OF THE INVENTION

In the field of digital data storage systems, most commercial computers employ Winchester-type disk drives to store application program software and related data. The predominant commercial hard disk drive standard is referred to as the 5¼" disk drive. A new standard has emerged, which is commonly referred to as the 3½" disk drive, which can store considerably more data in a substantially smaller configuration as compared to earlier 5¼" disk drives. Each 3½" hard disk, for example, is capable of storing in excess of one gigabyte of information, which is equivalent to eight billion bits of information.

In a digital disk drive storage system, digital data is stored in the form of magnetic energization on a series of concentric, closely spaced tracks comprising the surface of the magnetizable rigid hard disks. Data is applied to, and retrieved from, the rotating disks by magnetic heads which are mounted on a head positioner assembly, and shifted from track to track by the energization of a magnetic coil assembly. Alignment of the magnetic coil assembly and the head positioner mounting surfaces is critically important as any degree of positional shifting at the mounting interface may cause read and/or write errors of varying severity.

A magnetic head positioner assembly typically comprises a central rotating positioner body including a plurality of rigid integral positioner arms with magnetic read/write heads being mounted resiliently or rigidly on the extreme ends of the positioning arms. The positioning arms are interleaved into and out of the stack of rotating magnetic disks typically by means of a magnetic coil assembly mounted on the main body of the head positioner. The coil normally interacts with a permanent magnet structure, and the application of current to the coil in one polarity causes the head positioner arms and heads to shift in one direction, while current of the opposite polarity shifts the head positioner arms and heads in the opposite direction.

A common mounting scheme involves a plurality of mounting screws, typically four such screws, which secure the magnetic coil assembly to the head positioner body. The four screw attachment scheme is intended to minimize misalignment between the magnetic coil assembly and head positioner body which adversely affects the read and write performance of the disk drive unit and which, over time, may ultimately result in the failure of the disk drive unit. However, designs which employ four or more mountings screws typically exhibit poor mechanical resonance characteristics and often involve increased inertia associated with the additional mass of the screws. Moreover, such designs require costly and time consuming alignment procedures to properly mount the magnetic coil assembly to the head positioner body, and often require additional alignment features such as guide pins and the like. Mechanical resonance and head positioning performance suffer as additional alignment features are added to the mounting surfaces. Such designs also require expensive and time consuming machining which is necessary to produce head positioner body and/or the magnetic coil assembly mating surfaces having a high degree of precision.

As disk drive storage capacities and disk rotational velocities continue to increase, it becomes critically important that the magnetic read/write heads be accurately positioned, and that the heads are not subject to undesired shifting in their position as a result of mechanical misalignment of the head positioning apparatus which is subject to mechanical and thermal cycling.

Accordingly, a principal object of the present invention is to provide an improved magnetic head positioner assembly with high precision, self-aligning coil assembly and head positioner mounting surfaces providing greater accuracy and consistency in the positioning of the magnetic heads despite vibration, thermal cycling, and the like.

SUMMARY OF THE INVENTION

In accordance with one aspect of the present invention, a head positioner assembly includes a head positioner body having a seating surface, a magnetic coil assembly including a magnetic coil and a bobbin having a mounting surface, with the head positioner seating and bobbin mounting surfaces being self-aligning at a plurality of mounting locations for coupling the magnetic coil assembly to the head positioner body.

One feature of the invention involves an integral head positioner member which includes a seating surface for receiving a magnetic coil assembly on one end and a plurality of outwardly extending rigid integral arms on the other end. The head positioner seating surface may further include a main seating face and two lateral seating faces extending inwardly, preferably at acute angles from the main seating face. The angles formed between the main seating face and each angled lateral seating face may be substantially equivalent. Two or more fastener bores may be included on the main seating face or elsewhere on the positioner seating surface for receiving securing fasteners. The head positioner assembly is preferably formed from an extrusion manufacturing process which provides the requisite degree of precision with respect to the angled head positioner seating surfaces.

In accordance with another aspect of the invention, the position of the magnetic coil assembly is fixed to the head positioner body by a pair of angled mating surfaces on each of the two parts, arrangements for limiting relative axial movement of the two parts, and fasteners for drawing the two parts into engagement with each other. The angled mating surfaces may be formed having substantially similar angles, or may provide for an interference, or slight difference, between the angled surfaces.

In accordance with another aspect of the invention, a magnetic coil assembly comprises a rigid integral bobbin member having a mounting surface and an outwardly extending coil frame onto which a magnetic coil is affixed. The bobbin mounting surface preferably comprises a central mounting face and two acutely angled lateral mounting faces which extend outwardly from the central mounting face. Alternatively, the bobbin mounting surface may be formed to include two angled lateral mounting faces. The integral bobbin is preferably fashioned from light-weight aluminum using a die-cast manufacturing process which provides a high degree of precision with respect to the angled mounting surfaces. The outwardly extending coil frame may be generally triangular in shape, and may further include a small gap along the outermost edge of the coil frame. The gap may be provided to reduce undesirable eddy currents in the coil frame associated with the energization of the magnetic coil. An additional wedge of supporting material between the coil frame arms nearest the bobbin mounting surface may be included to provide additional support for the coil frame.

Another aspect of the present invention involves the angular interference, or difference in angles, between the bobbin mounting surface and the head positioner seating surface. The angles forming the bobbin lateral mounting surface may be slightly greater than the angles forming the head positioner seating surface. This preloading of the bobbin mounting surface improves the alignment between the bobbin mounting surface and positioner seating surface when the magnetic coil assembly is securely fastened to the head positioner body. Thus, proper alignment of the mounting surfaces is maintained over time, resulting in part from this interference between the angled mounting surfaces.

The self-aligning feature represents an important aspect of the present invention. An alignment ledge protrudes outwardly from the positioner seating surface and engages the bobbin alignment edge, comprising a portion of the lower edge of the bobbin mounting surface, when the magnetic coil assembly is installed on the head positioner body. When the bobbin alignment edge engages the positioner alignment ledge, bobbin fastener holes, provided on the bobbin mounting surface, automatically align with the securing bores provided in the positioner seating surface. The self-aligning precision bobbin and head positioner mounting surfaces result in part from the manner in which they are manufactured. The bobbin is preferably fashioned from light-weight aluminum using a die-cast process, resulting in a precision molded integral light-weight bobbin member. The head positioner body is preferably fashioned from light-weight metal, such as magnesium, using an extrusion process which provides the requisite degree of precision with regard to the mounting surfaces and alignment ledge. These manufacturing processes in combination with the self-alignment feature of the present invention substantially reduces the cost of manufacturing the bobbin and head positioner member while providing a mounting interface that significantly reduces undesired shifting of position due to mechanical vibration and thermal cycling.

The construction of the magnetic coil assembly involves another aspect of the invention. The magnetic coil is preferably comprised of a plurality of metal wire windings being dipped in an epoxy material and wound about the coil frame member of the bobbin. A coil groove may be integrally included at the coil frame and bobbin mounting surface interface to receive the winding build-up and to help secure the windings to one another and to the bobbin. An electrical lead is attached to the magnetic coil for connection to a current source. Alternatively, the wire windings may be pre-coated with a coating of epoxy-type material which, after being wound about the coil frame, are oven heated to a prescribed temperature and for a prescribed time, thereby setting the epoxy. Construction by these methods results in an integral magnetic coil assembly with the coil windings being integrally formed to one another and to the bobbin.

Another important feature of the present invention involves the attachment points between the positioner seating surface and bobbin mounting surface. The bobbin mounting surface preferably comprises an upper bobbin mount and a lower bobbin mount. The upper and lower bobbin mounts may be substantially identical, with each mount including two outwardly extending angled lateral mounting faces. Thus, four lateral mounting faces engage the positioner lateral seating faces when the magnetic coil assembly is mounted to the head positioner body. Moreover, two fasteners may be employed to securely fasten the coil assembly to the head positioner body, thereby forming a four point attachment arrangement using only two fasteners. The reduction in the number of fasteners required to secure the magnetic coil assembly to the head positioner without sacrificing mounting alignment and stability represents a significant improvement over prior art mounting configurations. Overall head positioner mass and inertia are reduced while mechanical resonance characteristics are improved.

Other objects, features, and advantages of the invention will become apparent from a consideration of the following detailed description and from the accompanying drawings.

DETAILED DESCRIPTION OF THE PREFERRED EMBODIMENT

Figure 1:
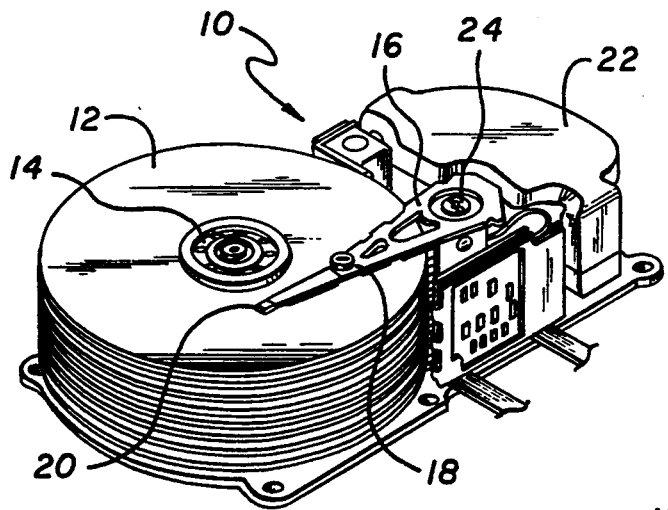
FIG. 1 is a top perspective view of a Winchester or hard disk drive unit with its upper cover removed.

Referring more particularly to the drawings, FIG. 1 illustrates hard disk drive unit 10 with its upper housing cover removed. Hard disk drive unit 10 includes a plurality of rigid magnetic storage disks 12 which are stacked coaxially in a tandem spaced relationship, and rotate about a common spindle 14 at a relatively high rate of rotation. Head positioner body 16 includes a plurality of interleaved head positioner arms 18, each having one or more magnetic heads 20 mounted thereon for reading and writing information magnetically onto disk stack 12. Head positioner body 16 is rotated about a stationary axis 24, causing positioner arms 18 to interleave into and out of magnetic storage disk stack 12. Magnetic coil assembly 30, shown mounted to seating face 36 of head positioner body 16 in FIG. 2, rotates within permanent magnet structure 22, causing head positioner arms 18 to sweep across the surface of magnetic storage disks 12.

Figure 2:
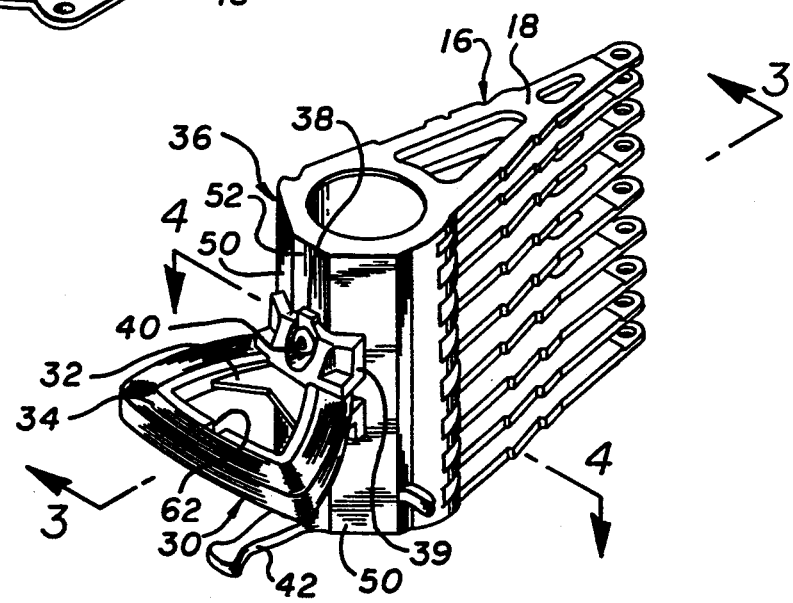
FIG. 2 is a perspective view of a magnetic coil assembly mounted on a head positioner.

FIG. 2 shows magnetic coil assembly 30 mounted to seating face 36 of head positioner body 16. When magnetic coil 34 is energized in one direction, magnetic heads 20 are moved toward the center of storage disks 12. When magnetic coil 34 is energized in the opposite direction, force is provided to rotate heads 20 in the opposite direction toward the outer periphery of storage disks 12.

Figures 4, 5:
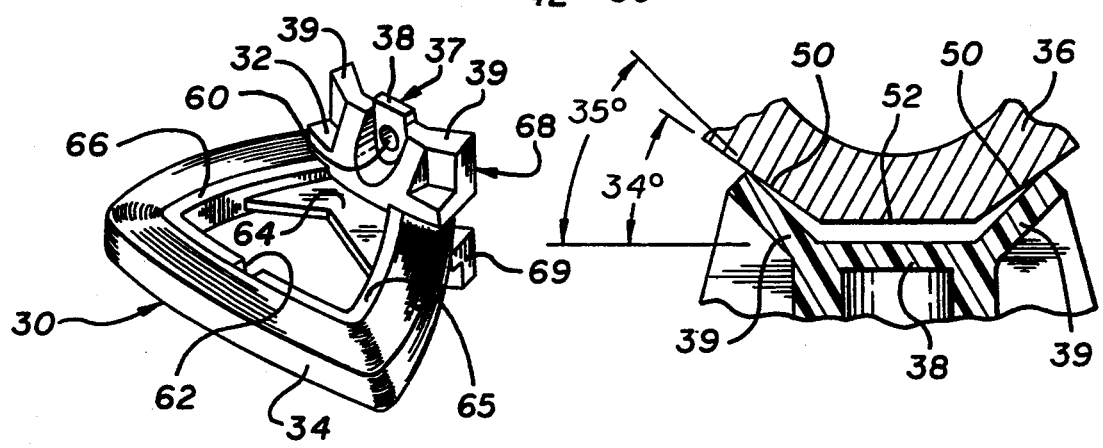
FIG. 4 is an exaggerated cross-sectional view of a mounting interface between a magnetic coil assembly and a head positioner.
FIG. 5 is a perspective view of a magnetic coil assembly showing a bobbin and integral magnetic coil.

A perspective view of magnetic coil assembly 30 is provided in FIG. 5. Magnetic coil assembly 30 is comprised of two main integral components, bobbin 32 and magnetic coil 34. Bobbin 32 is further comprised of coil frame 66 and bobbin mounting surface 37. Coil frame 66 extends outwardly from bobbin mounting surface 37 and comprises to coil frame arms 65 generally forming a triangular shape and including bobbin gap 62 between opposed ends of coil frame arms 65 at the outer extent of coil frame 66. Bobbin wedge support 64, extending from bobbin mounting surface 37 and between a portion of each coil frame arm 65, provides structural support for coil frame 66.

Bobbin mounting surface 37 comprises upper bobbin mount 68 and lower bobbin mount 69, each of which includes bobbin central mounting face 38 and bobbin lateral mounting faces 39 extending outwardly from central mounting face 38 generally at acute angles. Central mounting face 37 includes fastener hole 60 through which a fastener, preferably a screw-type fastener, passes to mount magnetic coil assembly 30 to positioner seating surface 36 of head positioner body 16.

FIG. 4 illustrates a unique aspect of the invention whereby the geometries of positioner seating surface 36 and bobbin mounting surface 37 provide for an angular interference, or angular difference, between positioner lateral seating faces 50 and bobbin lateral mounting faces 39. As shown in the highly exaggerated depiction provided in FIG. 4, each bobbin lateral mounting face 39 forms an angle of approximately 35 degrees with respect to the horizontal reference of bobbin central mounting face 38. Positioner lateral seating faces 50 form angles of approximately 34 degrees with respect to the horizontal reference of positioner main seating face 52. The interference, or difference, between the angled positioner seating surface 36 and angled bobbin mounting surface 37 results in the preloading of bobbin mounting surface 37, and provides full surface contact between bobbin lateral mounting faces 39 and positioner lateral seating faces 50. High mechanical resonances are achieved through high sectional inertia in the mounting region of bobbin mounting surface 37 and positioner seating surface 36 resulting from this dimensioning scheme. It is noted that a similar dimensioning scheme may be achieved by mating surfaces comprised of two angled lateral mounting surfaces with no horizontal surface interposing the angled surfaces.

Figure 3:
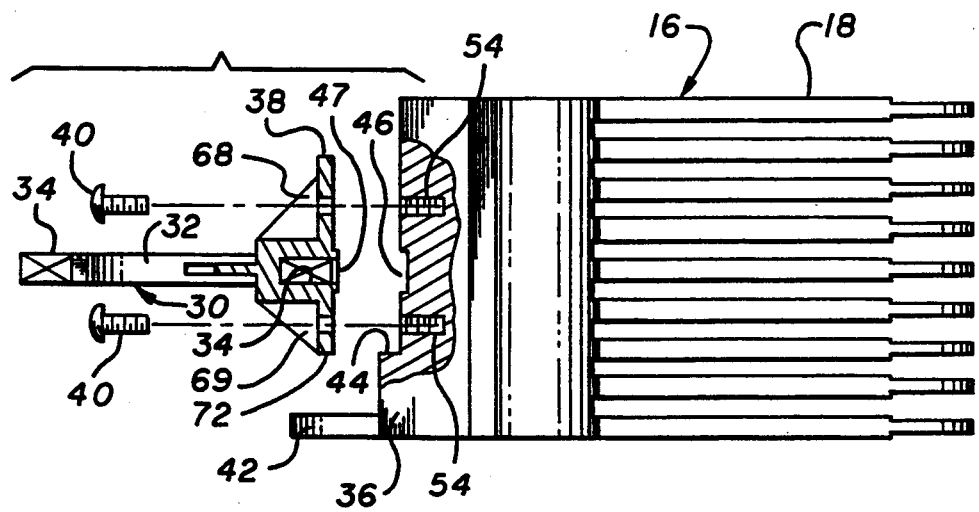
FIG. 3 is a cross-sectional view of a magnetic coil assembly being mounted to a head positioner.

FIG. 3 is a cross-sectional view of magnetic coil assembly 30 being mounted on head positioner body 16. Upper bobbin mount 68 and the lower bobbin mount 69 may be respectively mounted on positioner seating surface 36 by fasteners 40 passing through fastener holes 60 and being received within positioner mounting bores 54. Self-alignment of bobbin mounting surface 37 and positioner seating surface 36 is achieved by alignment ledge 44, protruding outwardly from positioner seating surface 36, which engages lower bobbin mount 69. When magnetic coil assembly 30 is mounted to head positioner body 16, bobbin alignment edge 72, comprising the lower edge of lower bobbin mount 69, engages alignment ledge 44 such that fastener holes 60 of bobbin mounting surface 37 automatically align with positioner mounting bores 54 provided on positioner seating surface 36. This self-alignment feature is an important aspect of the present invention which eliminates the need for additional alignment implements or time consuming alignment procedures.

Other features of the invention, as illustrated in FIG. 3, include coil groove 46 on positioner seating surface 36 providing a gap between magnetic coil 34 and positioner seating surface 36° Coil groove 46 provides ample space for magnetic coils 34 having varying dimensions. Also shown in FIG. 3 is crash stop arm 42 which engages crash stop apparatus to prevent head positioner arm 18 from rotating beyond prescribed limits.

Figure 6:
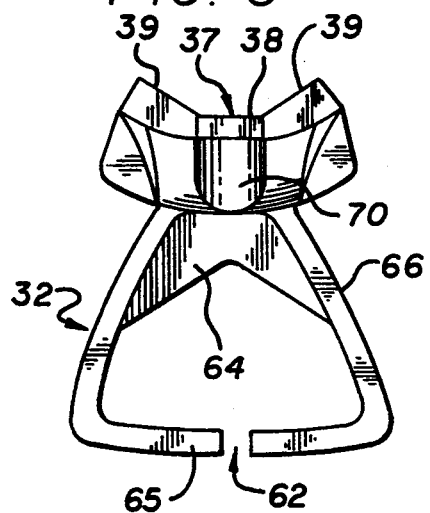
FIG. 6 is a top perspective view of the bobbin portion of a magnetic coil assembly.

FIG. 6 is a showing of bobbin 32 which comprises the primary structural component of magnetic coil assembly 30. Bobbin 32 is comprised of integral bobbin mounting surface 37 and coil frame 66. Preferably, bobbin 32 is fashioned from low-weight, high-strength metal, such as aluminum, through a die-casting process. The requisite degree of precision of angled bobbin mounting surface 37 is consistently achieved through the die-casting manufacturing process. Similarly, head positioner body 16 is preferably formed from low-weight, high-strength metal, such as magnesium, through an extrusion process which provides the requisite degree of precision with respect to angled positioner seating surface 36. Moreover, the self-aligning feature of the present invention is achieved in part from employing these manufacturing methods which consistently produce high precision bobbins 32 and head positioner body members 16 at a relatively low cost, thereby eliminating costly manual machining operations.

Bobbin lateral mounting faces 39 are shown extending outwardly at acute angles with respect to bobbin central mounting face 38. As previously discussed, the geometry of positioner seating surface angles 36 and bobbin mounting surface angles 37 produce an interference between the mating surfaces which improves the self-alignment aspect of the invention. Alternatively, the high precision positioner seating and bobbin mounting surfaces 36 and 37 respectively may be dimensioned to have equivalent mating angled surfaces, rather than an interference between the angled mating surfaces.

Bobbin gap 62 is provided between opposed ends of coil frame arms 65 for the purpose of eliminating undesirable eddy currents in the metal coil frame 66 associated with the energization of magnetic coil 34. Prior art designs not employing such a gap produce eddy currents that may disrupt the magnetic field developed within the coil assembly.

Figure 7:
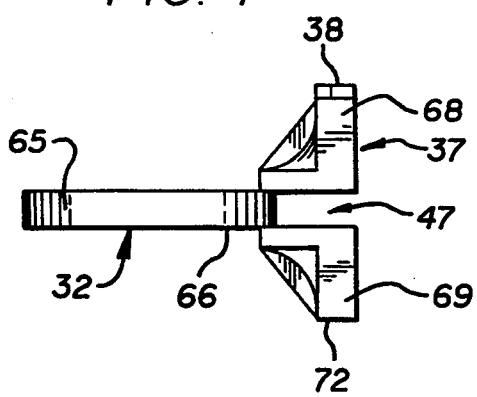
FIG. 7 is a side view of a magnetic coil bobbin.

FIG. 7 is a side view of bobbin 32 with upper and lower bobbin mounts 68 and 69 respectively formed as to provide coil guide 47. Magnetic coil assembly 30 may be manufactured by dipping magnetic coil windings 34 in epoxy material and then winding magnetic coil windings 34 around coil frame 66 and through coil guide 47. After the winding process has concluded, magnetic coil assembly 30 may be set aside to allow the epoxy to set and harden. Alternatively, magnetic coil windings 34 may include a pre-coat of epoxy which, after being wound about coil frame 66, may then be oven heated at a prescribed temperature and for a prescribed duration of time allowing the epoxied magnetic coil windings 34 to adhere to one another and to coil frame 66 and coil guide 47, thus forming integral magnetic coil assembly 30.

Figures 8, 9:
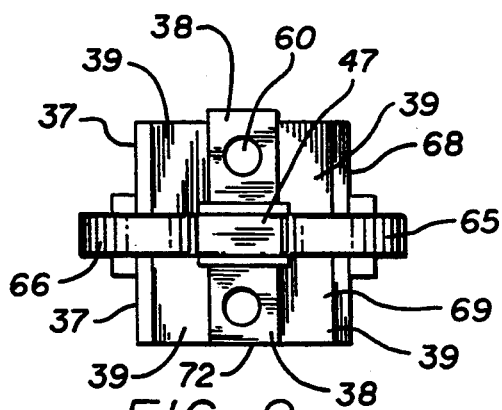
FIG. 8 is a front view of a magnetic coil bobbin.
FIG. 9 is a rear view of a magnetic coil bobbin.

FIG. 8 is a front illustration of bobbin 32 with fastener holes 60, preferably aligned through a vertical center line of bobbin 32, provided on upper and lower bobbin mounts 68 and 69 respectively. Bobbin gap 62 is shown between opposed ends of coil frame arms 65 comprising coil frame 66. Bobbin alignment edge 72 is shown as a portion of the bottom edge of lower bobbin mount 69.

FIG. 9 is a rear showing of bobbin 32 with upper and lower bobbin mounts 68 and 69 each being comprised of bobbin mounting surfaces 37. Bobbin mounting surface 37 is further comprised of bobbin central mounting face 38 and bobbin lateral mounting faces 39 extending outwardly at acute angles with respect to bobbin central mounting face 38. Fastener holes 60 are provided on bobbin central mounting faces 38.

In conclusion, it is to be understood that the foregoing detailed description and the accompanying drawings relate to one illustrative implementation of the present invention. The invention is not limited to this one illustrative implementation. Thus, by way of example and not of limitation, the positioner seating surface angles and bobbin mounting surface angles may be greater or less than 34 degrees and 35 degrees respectively, and need not form acute angles. The interference between the angled mating surfaces may be less than or greater than 1 degree. Also, the positioner and bobbin angled mating surfaces may be formed having substantially equivalent angles. Further, the precision bobbin and positioner members may be manufactured by methods other than the described die-cast and extrusion processes. Rather than using epoxy-based material to adhere the magnetic coil windings to one another and to the bobbin, other bonding type materials may be employed. Moreover, the self-alignment feature of the invention may be implemented by means other than the positioner alignment ledge engaging the bobbin alignment edge. Horizontal alignment arrangements may also be employed in addition to the vertical alignment arrangements. Mounting configurations other than a four point attachment design may be utilized. Rather than using two fasteners to secure the magnetic coil assembly to the head positioner body, one fastener or more than two fasteners may be used, which need not be aligned along the vertical center-line of the bobbin mounting surface. Accordingly, the present invention is not limited to the system as described in detail herein and as shown in the accompanying drawings.

What is claimed is:

1. A hard disk storage system including a plurality of magnetic storage disks coaxially mounted on a common spindle, a permanent magnet structure, and a rotatable head positioner assembly, including a plurality of magnetic heads and defining an axis of rotation, for shifting the position of said heads across said magnetic disks, said head positioner assembly comprising:
   an integral head positioner member including a seating surface and a plurality of outwardly extending rigid integral arms;
   said seating surface comprising a main seating face defining first and second opposite lateral edges and first and second lateral seating faces respectively extending from said first and second lateral edges of said main seating face, said lateral seating faces making respective acute angles with a plane defined by said main seating surface and extending beyond said lateral edges thereof;
   an alignment ledge included on said main seating face;
   a magnetic coil assembly for rotating within said permanent magnetic structure, and comprising a rigid integral bobbin having a mounting surface, an outwardly extending coil frame, and a magnetic coil affixed to said coil frame, said coil frame including a pair of frame arms, each of said frame arms defining an end, said frame arms being separated by a gap located adjacent the ends of said frame arms;
   said bobbin mounting surface comprising a plurality of through-holes, a central mounting face defining first and second opposite lateral edges, and first and second lateral mounting faces respectively extending from said first and second lateral edges of said central mounting face, said lateral mounting faces making respective acute angles with a plane defined by said central mounting face and extending beyond said lateral edges thereof, at least one of said lateral mounting faces forming an acute angle with a corresponding lateral seating face; and
   a plurality of bores in said positioner main seating face for mounting said bobbin to said positioner member whereby said bobbin through-holes and positioner member bores automatically register when, said bobbin engages said alignment ledge.

2. A hard disk storage system including a plurality of magnetic storage disks coaxially mounted on a common spindle, a permanent magnet structure, and a rotatable head positioner assembly, including a plurality of magnetic heads and defining an axis of rotation, for shifting the position of said heads across said magnetic disks, said head positioner assembly comprising:
   an integral head positioner member including a seating surface and a plurality of outwardly extending rigid integral arms;
   said seating surface comprising a main seating face defining first and second opposite lateral edges and first and second lateral seating faces respectively extending from said first and second lateral edges of said main seating face, said lateral seating faces making respective acute angles with a plane defined by said main seating surface and extending beyond said lateral edges thereof;
   an alignment ledge included on said main seating face;
   a magnetic coil assembly for rotating within said permanent magnetic structure, and comprising a rigid integral bobbin having a mounting surface, an outwardly extending coil frame, and a magnetic coil affixed to said coil frame;
   said bobbin mounting surface comprising a plurality of through-holes, a central mounting face defining first and second opposite lateral edges, and first and second lateral mounting faces respectively extending from said first and second lateral edges of said central mounting face, said lateral mounting faces making respective acute angles with a plane defined by said central mounting face and extending beyond said lateral edges thereof, at least one of said lateral mounting faces forming an acute angle with a corresponding lateral seating face; and
   a plurality of bores in said positioner main seating face for mounting said bobbin to said positioner member whereby said bobbin through-holes and positioner member bores automatically register when said bobbin engages said alignment ledge;

wherein said positioner lateral seating faces form angles with respect to said main seating face that are slightly smaller than the angles formed between said bobbin lateral mounting faces and said bobbin central mounting face, whereby when said bobbin is secured to said head positioner member, firm engagement is assured between said bobbin lateral mounting faces and said positioner lateral seating faces.

* * * * *